(No Model.) 9 Sheets—Sheet 1.
W. W. KIMBALL.
TRANSPORTING AND DISTRIBUTING VEHICLE.
No. 420,456. Patented Feb. 4, 1890.
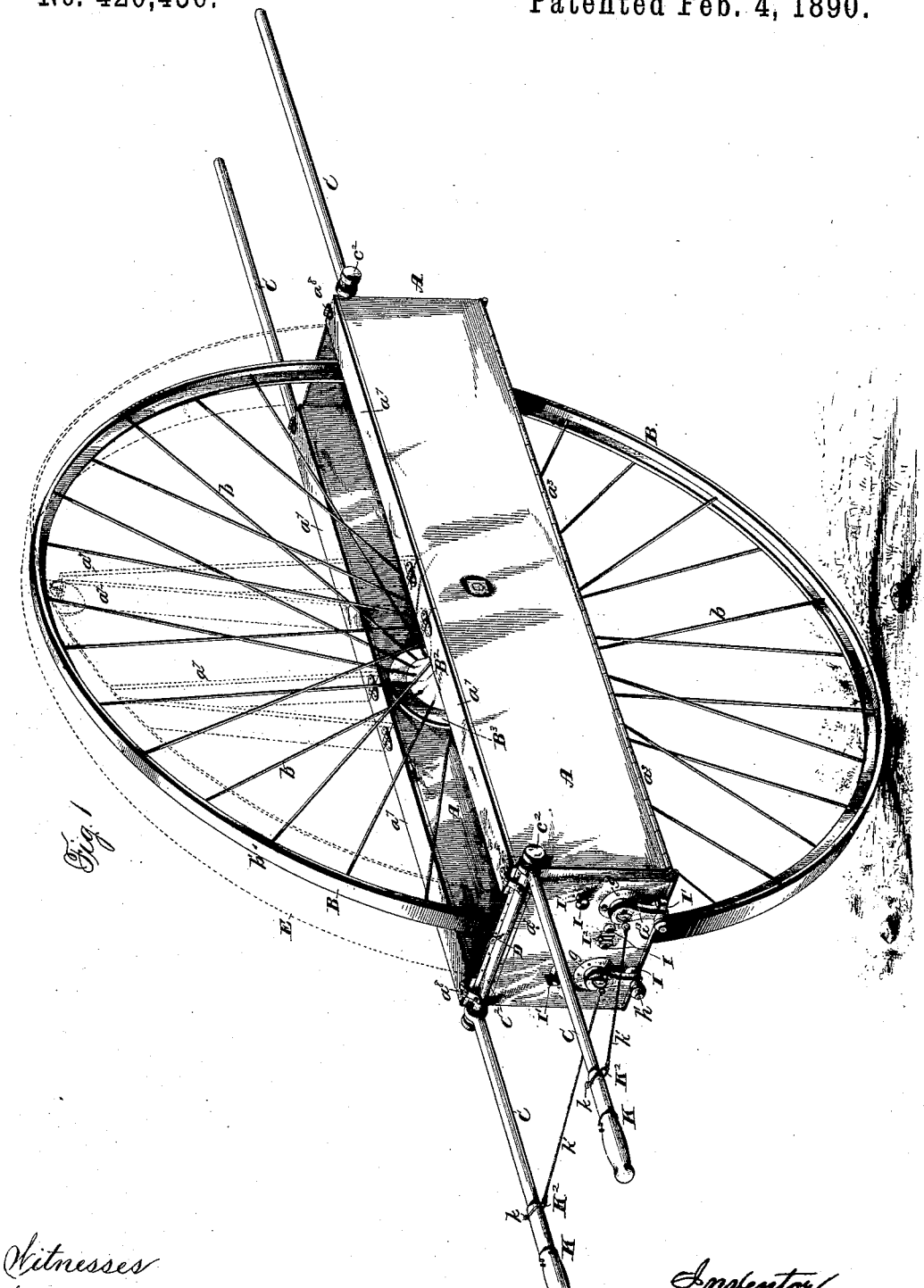

(No Model.) 9 Sheets—Sheet 2.
W. W. KIMBALL.
TRANSPORTING AND DISTRIBUTING VEHICLE.
No. 420,456. Patented Feb. 4, 1890.
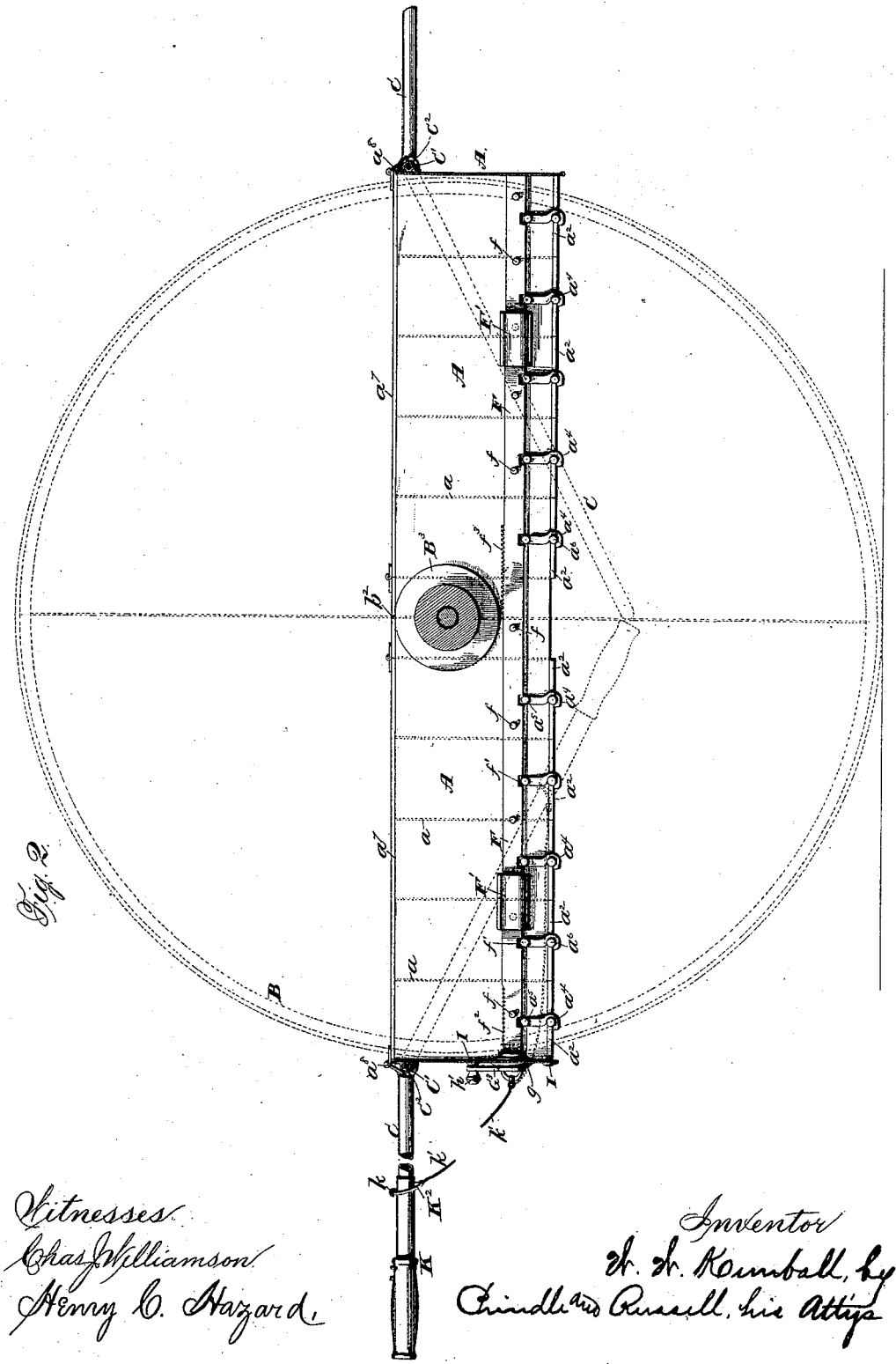

(No Model.) 9 Sheets—Sheet 3.
W. W. KIMBALL.
TRANSPORTING AND DISTRIBUTING VEHICLE.
No. 420,456. Patented Feb. 4, 1890.
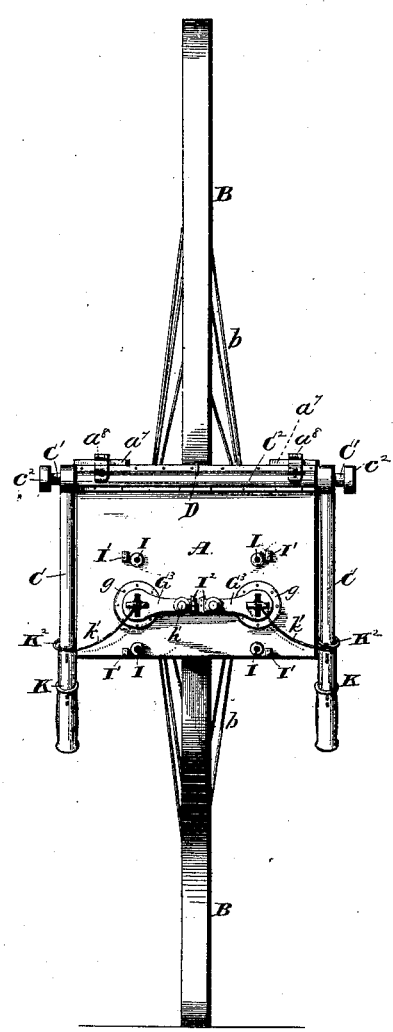
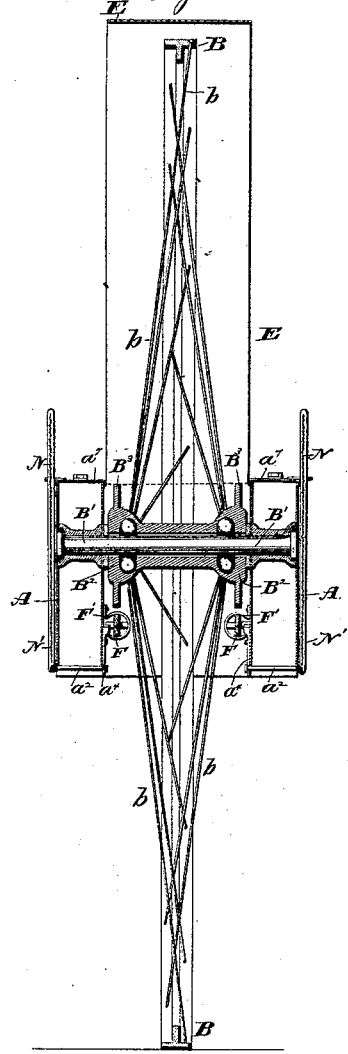
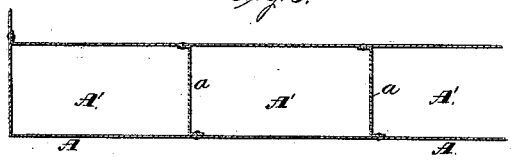

(No Model.) 9 Sheets—Sheet 4.
W. W. KIMBALL.
TRANSPORTING AND DISTRIBUTING VEHICLE.
No. 420,456. Patented Feb. 4, 1890.
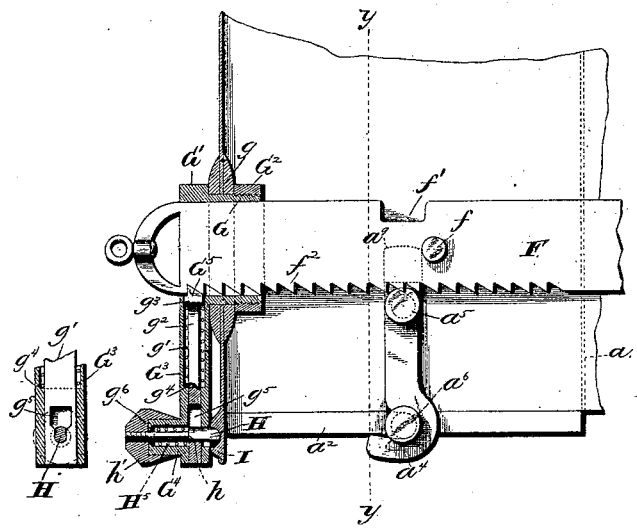
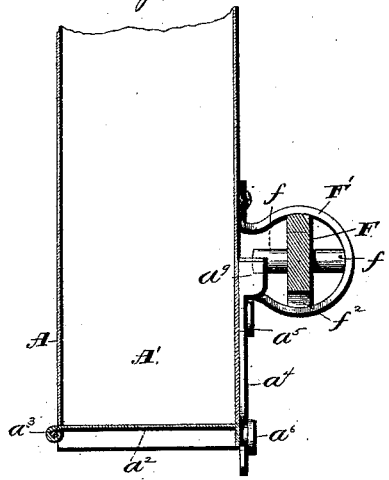
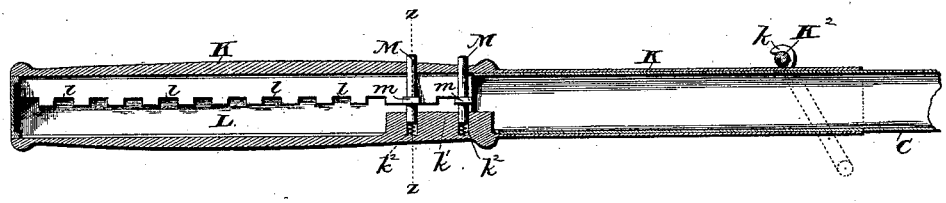
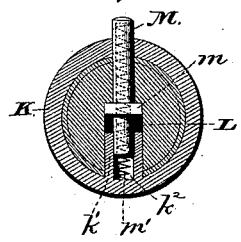
Witnesses
Chas J Williamson
Henry C. Hazard
Inventor
W. W. Kimball, by
Rindle & Russell, his Attys

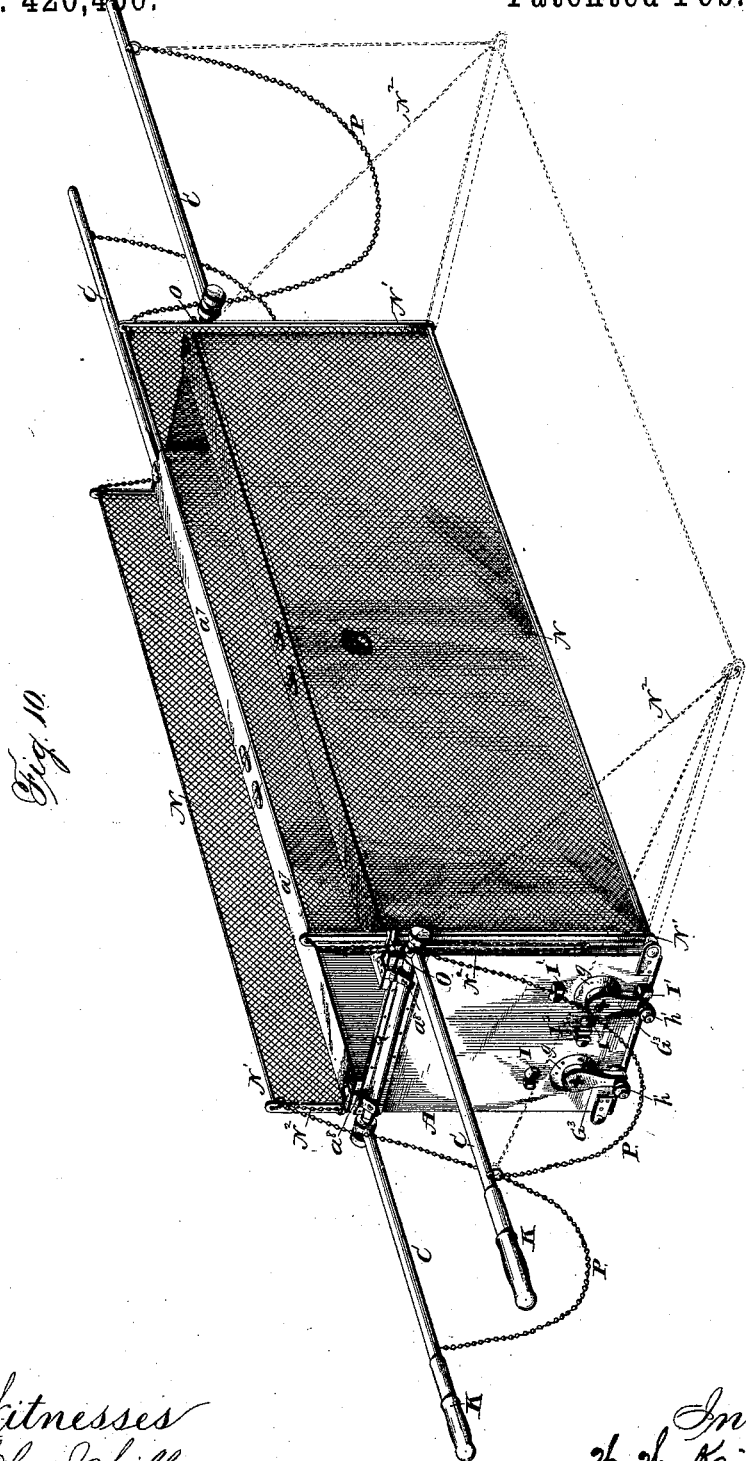

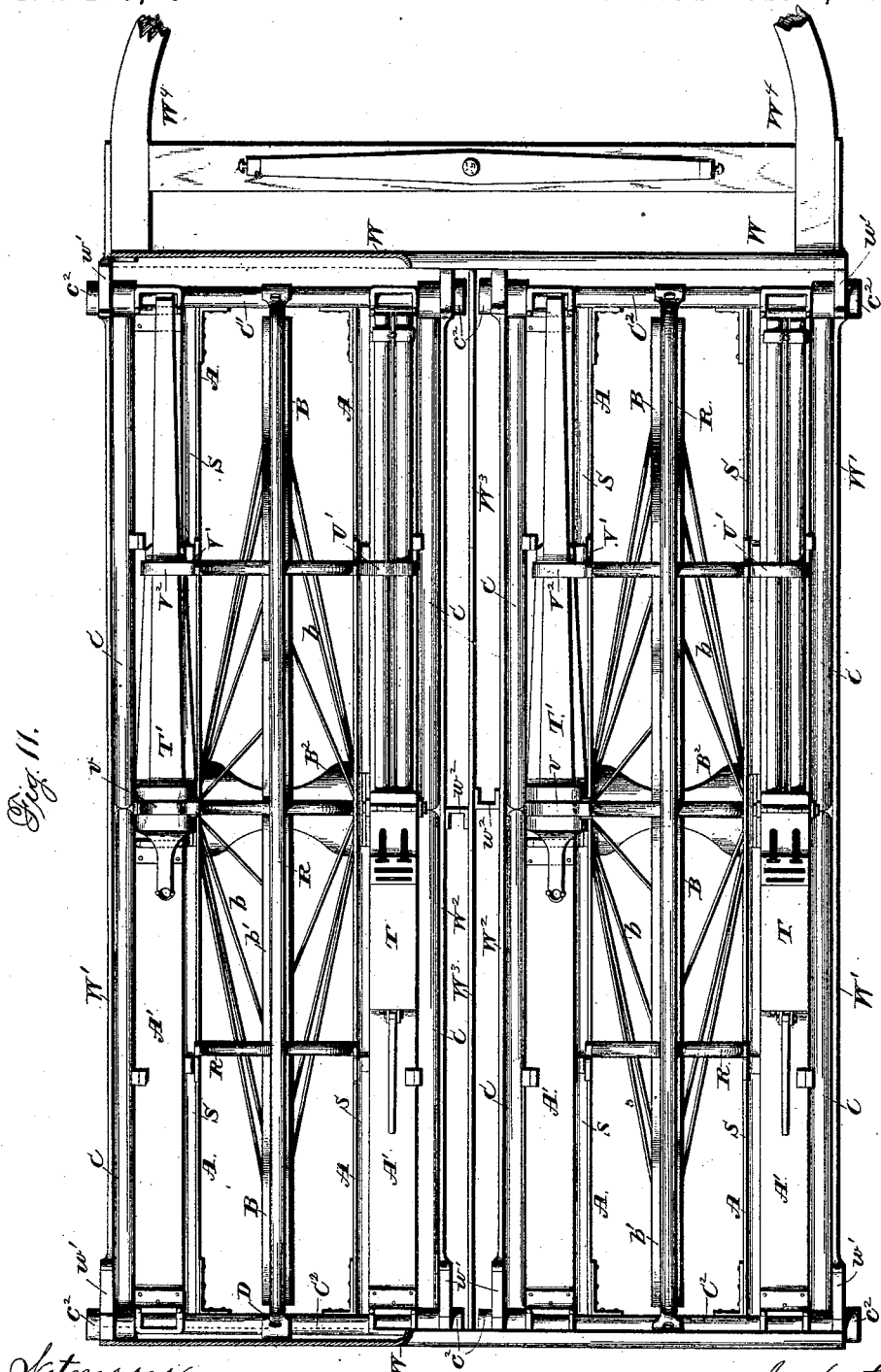

(No Model.) 9 Sheets—Sheet 7.

W. W. KIMBALL.
TRANSPORTING AND DISTRIBUTING VEHICLE.

No. 420,456. Patented Feb. 4, 1890.

Witnesses
Chas. J. Williamson
Henry C. Hazard

Inventor
W. W. Kimball, by
Bindle and Russell, his Attys (No Model.) 9 Sheets—Sheet 8.

W. W. KIMBALL.
TRANSPORTING AND DISTRIBUTING VEHICLE.

No. 420,456. Patented Feb. 4, 1890.

Witnesses
Chas. J. Williamson
Henry C. Hazard

Inventor
W. W. Kimball, by
Rindle and Russell, his attys

N. PETERS, Photo-Lithographer, Washington, D. C.

(No Model.)   9 Sheets—Sheet 9.

W. W. KIMBALL.
TRANSPORTING AND DISTRIBUTING VEHICLE.

No. 420,456.   Patented Feb. 4, 1890.

Witnesses
Chas. J. Williamson.
Henry C. Hazard.

Inventor
W. W. Kimball, by
Dindle and Russell, his Attys

UNITED STATES PATENT OFFICE.

WILLIAM W. KIMBALL, OF WASHINGTON, DISTRICT OF COLUMBIA.

TRANSPORTING AND DISTRIBUTING VEHICLE.

SPECIFICATION forming part of Letters Patent No. 420,456, dated February 4, 1890.

Application filed April 2, 1888. Renewed June 27, 1889. Serial No. 315,724. (No model.)

*To all whom it may concern:*

Be it known that I, WILLIAM W. KIMBALL, of Washington, in the District of Columbia, have invented certain new and useful Improvements in Transporting and Distributing Vehicles; and I do hereby declare that the following is a full, clear, and exact description thereof, reference being had to the accompanying drawings, in which—

Figure 12:
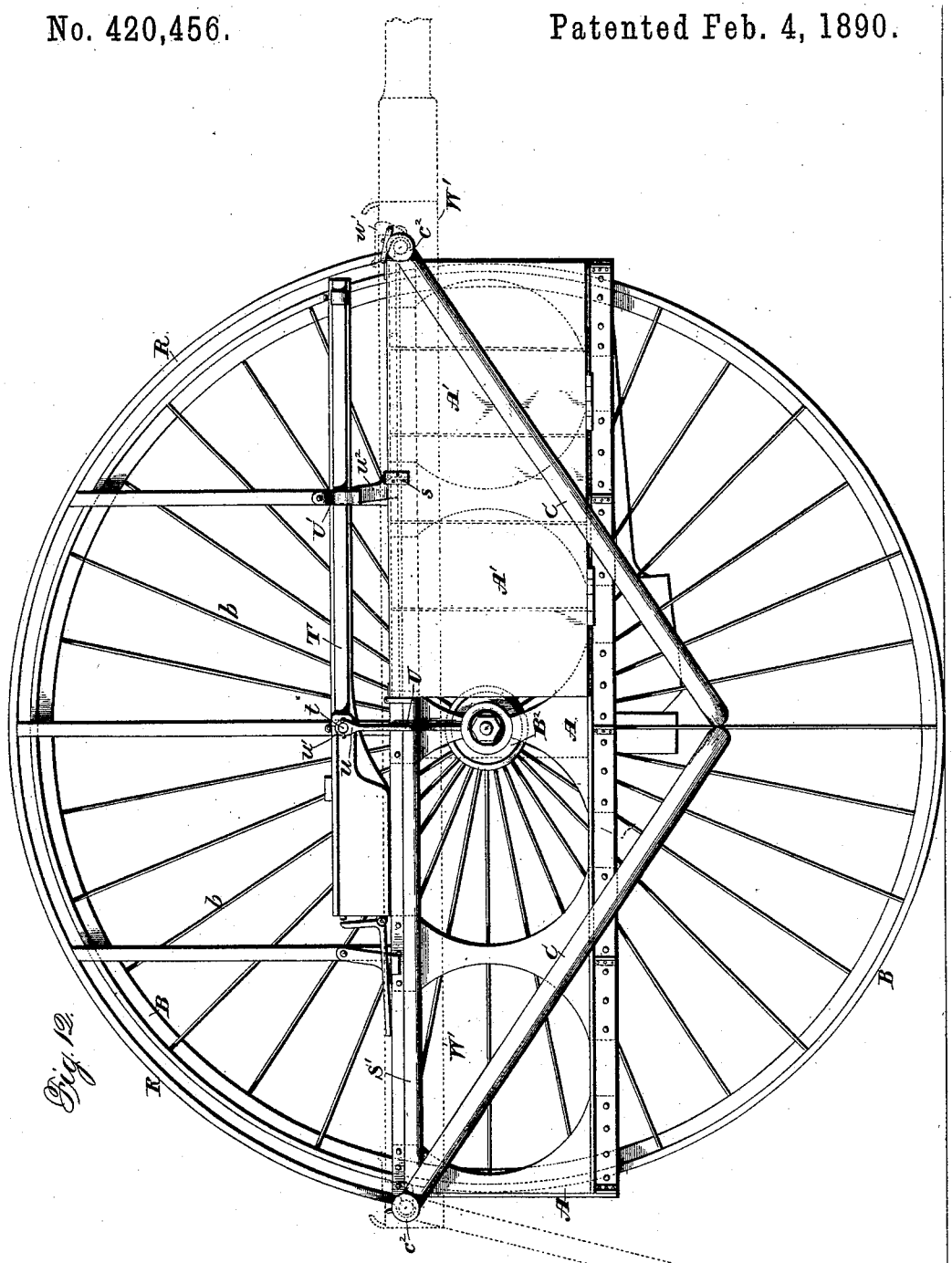
Figure 15:
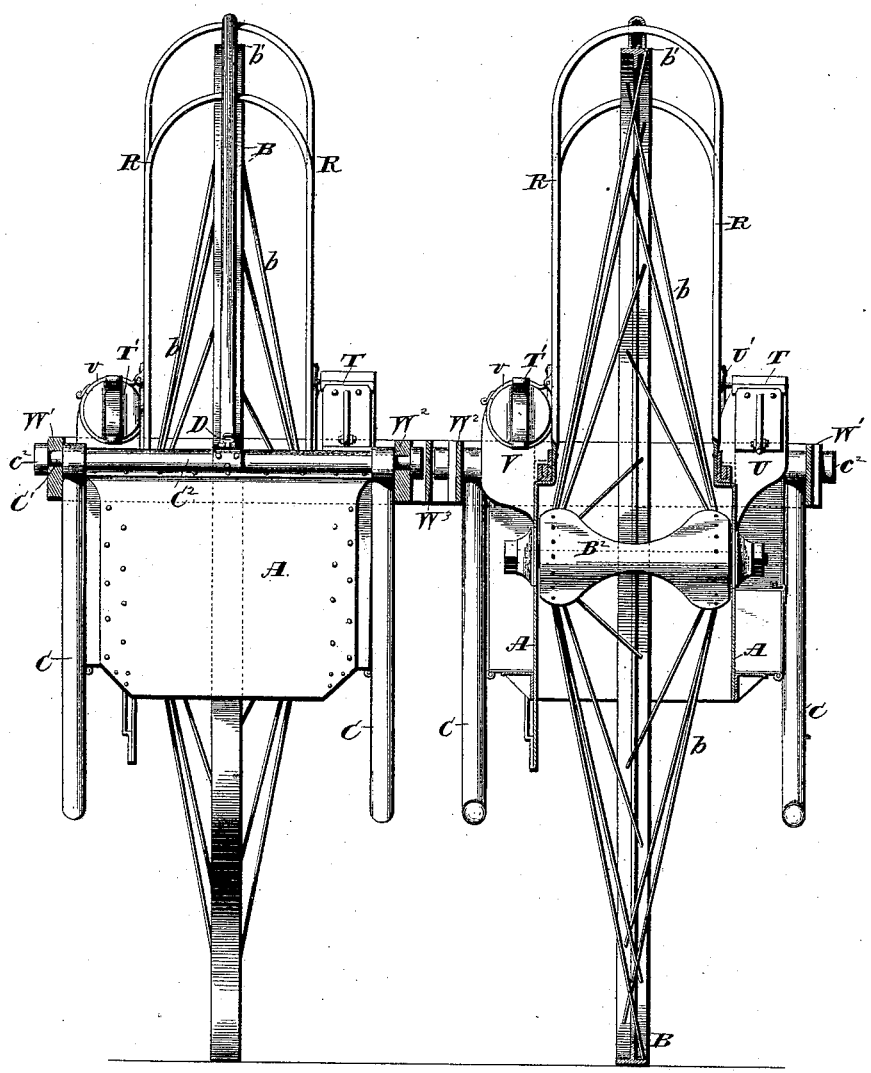
Figure 14:
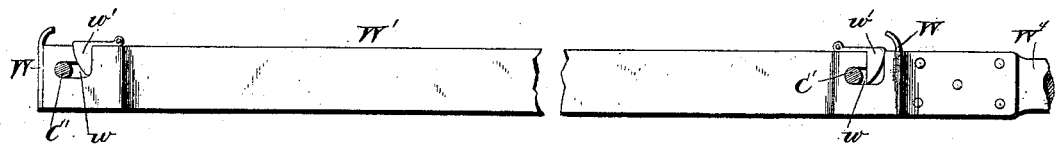
Figure 15:
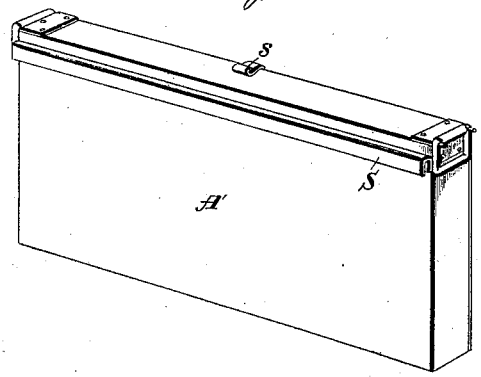

Figure 1 shows a perspective view of one of my small-arm ammunition-barrows with its shafts or handles in position for use by two men; Fig. 2, a longitudinal sectional view of the same; Fig. 3, a view of the same in end elevation; Fig. 4, a transverse sectional view of the same on line $x\ x$ of Fig. 1, showing the ambulance-hammocks in place on its sides; Fig. 5, a horizontal sectional view of one of the ammunition chests or holders on the barrow; Fig. 6, a detail view, partly in section, and showing the mechanism for dropping or distributing the ammunition from the boxes, as desired; Fig. 7, a view of a transverse section on line $y\ y$ of Fig. 6; Fig. 8, a detail longitudinal section of one of the handles constructed for properly operating the dropping or distributing devices; Fig. 9, a detail sectional view of the same on line $z\ z$ of Fig. 8; Fig. 10, a perspective view of one of the barrows provided with the hammock-nettings, the supporting-wheel being left off for sake of clearness; Fig. 11, a plan view showing the method and means of connecting two of my barrows together to form a two-wheeled vehicle and a modified form of the barrow; Fig. 12, a view in side elevation of one of the barrows shown in Fig. 11; Fig. 13, a transverse sectional view with the section on line $x'\ x'$ of Fig. 11; Fig. 14, a detail view in side elevation of the frame for connecting the barrows together; Fig. 15, a detail perspective view of one of the ammunition-cases used on the modified form of barrow, and Fig. 16 a detail sectional view showing the means of fixing the barrow-handles up or down, as desired.

Letters of like name and kind refer to like parts in each of the figures.

The object of my invention is to provide certain improvements in vehicles or means for transportion to be used in warfare; and to this end my invention consists in the vehicle, and in the construction, arrangement, and combination of the parts thereof, as hereinafter specified.

The vehicle or means of transportation, as hereinafter described and shown by me, is adapted not only for the transportation of ammunition, small-arms, and machine-guns, but also to secure the rapid distribution of ammunition to firing-lines. While it affords means for carrying and distributing ammunition with the greatest possible rapidity and protection to the one or ones running it, it can also be employed for carrying the wounded off of the field when it is empty or is not needed for distributing ammunition. As will be seen from the drawings, and from the hereinafter given description of my invention, its essential idea is the provision of light, easily run and operated vehicles, which can be used by one or two men for transporting and distributing ammunition and for other carrying purposes on the field of action, and which, when not in use in such way, can be combined as units to form together a vehicle of transportation to be drawn by horse or mule power.

For quickness and ease of handling on the battle-field in distributing ammunition, transporting small-arms or machine-guns or carrying the wounded, I have found the single-wheeled barrow form of vehicle the best. In the drawings I show several of these, each consisting, essentially, of a rectangular frame A, open in the center and supported upon a large central wheel B, situated within the open space in the frame. I do not limit myself to any particular material for or form of the frame or wheel. The wheel is, however, preferably, to be a metal one of wrought-iron or iron and steel and of the light skeleton form shown in the drawings, with the spokes $b\ b$ of small metal rods and the tire $b'$ formed of a metal ring flanged around its inner periphery for strength and stiffness.

The frame is preferably made of steel, so that it is strong and yet light.

The means of journaling the shaft of the wheel in the frame sides, or of supporting the frame on the wheel, need not be particularly described, as it forms no essential part of my invention. Whatever form of journal-bearing or connection between the wheel and frame is used the latter should be supported at a point substantially midway of its length, as shown, so as to be balanced to bring all the weight on the wheel and leave little or none to come upon the shafts or handles to be described hereinafter.

As shown in the drawings, (see Fig. 4,) the wheel is journaled upon a shaft B′, fastened at opposite ends in the frame sides.

For securing ease of running I prefer to provide the wheel-hub $B^2$ or journal with the well-known form of ball-bearing engaging the shaft periphery. The wheel-hub is a comparatively long one, and the spokes extending from near its ends to the tire are arranged in the same way as in the well-known bicycle-wheels, which are made to combine lightness with strength and stiffness. The tread of the wheel is shown as flat, but can be slightly concaved or otherwise shaped, as desired.

The frame A is formed entirely of steel plates, bent and riveted, or otherwise fastened together, so as to give the required shape. The sides of the frame in the barrow illustrated in Figs. 1 to 10, inclusive, are made double, as shown, so as to form the cartridge-receiving chambers or boxes A′ A′ on opposite sides of the wheel B. Each of these chambers or boxes is preferably divided up into a number of parts by vertical transverse partitions $a\ a\ a$, each formed of a metal plate flanged at its sides and with the flanges $a'\ a'$ attached to the casing or box sides. As shown in the drawings, there are ten of these partitions, dividing the box or casing up into eleven compartments. This particular number is not necessary and can be departed from, as desired, without departure from my invention. The lower side of each compartment, except the middle one of each box or casing, is closed with a door or movable bottom $a^2$, hinged to the casing side at $a^3$ and normally locked shut by means of a pendent hook $a^4$, pivoted to the casing at $a^5$ and engaging a pin or lug $a^6$ on said door or bottom. The middle compartment of each box or casing is occupied by the bearing or support for the wheel-shaft and needs no bottom. The top of each casing is closed by means of the two oppositely-swinging lids $a^7$ $a^7$, hinged to the casing by transverse pivots or hinges situated at or near a point midway of the length of the casing. As shown, the two hinges are situated just above the partitions at opposite ends of the middle compartment of the casing, and therefore having a space equal to the length of such compartment between them. With this construction if the two lids or covers of a casing be swung up toward each other until their ends meet they can easily be fastened together, so as to brace each other. As they are inclined upward toward each other, they will then offer only inclined surfaces on their outer or exposed sides, for a purpose to be described hereinafter. For fastening it down to close the casing each lid or cover is on its outer end provided with a hasp or catch $a^8$ to engage a lug or corresponding fastening device on the casing end. These fastenings on the lids can easily be made so that they will serve to lock the ends of the lids firmly together when the latter are swung up toward and against each other, as just described above, and I prefer to so make them.

The cells or compartments in the box or casing can be of the size and dimensions to hold each eight of the ordinary card or pasteboard pockets holding twenty rounds each. The barrow-load would then be thirty-two hundred rounds. The size, dimensions, and number of the cells can, however, obviously be varied as desired to conform to the conditions required by other kinds and dimensions of ammunition or the nature of the material to be carried.

Figure 16:
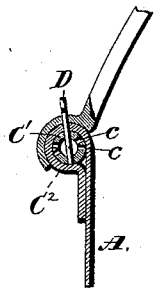

Each barrow is shown as provided with handles C C at each end, so that two men can run it. Two men are, however, not necessary, as the barrow can be pushed or drawn by one man if two men could not be spared, or if one of the two men should be killed or disabled while delivering ammunition to a firing line. The two handles of each pair are fixed to the opposite ends of a shaft C′, extending through a transverse bearing $C^2$ on the respective end of frame A. This shaft is preferably, as shown in Fig. 16, made hollow or tubular for lightness' sake. The handles thus connected with the frame ends can be swung down into position to act as legs for steadying and holding the barrow upright when it is being loaded or is not in active use, or up into position to act as handles or shafts for guiding and moving the barrow. When they are not in use as handles or legs, they can be swung inward toward each other, as indicated in Fig. 2. They are then out of the way, so that the barrows can be coupled together into a suitable frame, as described hereinafter.

Any desired means for fastening and holding the handles in the different positions into which they are swung can be used. In the drawings I show for this purpose a pin D, passing in through a hole in the shaft-bearing $C^2$, and several holes $c\ c\ c$ through the shaft adapted to be engaged by the pin. These holes are so situated and run in such directions that one of them will come into line with the pin D when the shaft is turned to bring the handles into either one of the above desired positions. When the handles have been swung up or down into the desired position, they can then be locked fast by pushing the pin D into one of the holes in shaft C′. Said shaft is at its opposite ends continued out beyond the sides of the casing or frame of the barrow and beyond the points at which the handles are attached. Upon its projecting ends are the heads $c^2\ c^2$, for a purpose to be described.

For the protection of a man pushing the barrow, as in delivering ammunition to a firing line in action, I contemplate providing a guard E, of steel or other metal, as indicated in Figs. 1 and 4, attached at its ends to the ends of the frame A, and extending up over the wheel. This guard is of a width substantially equal to that of the wheel-space within frame A. With the covers or lids of the ammunition-boxes swung up and back and fastened together, as described hereinbefore, the one pushing the barrow will then have a guard in front of him of the full width of the barrow, such guard presenting centrally the curved surface of shield E and the sides of such shield the inclined surfaces of the raised box-lids.

The hinged doors or traps $a^2$ $a^2$, closing the bottoms of the respective compartments of the ammunition box or casing can be unlocked and opened in any desired way to drop the contents of the compartment where needed; but I prefer to provide the means shown in the drawings, whereby a barrow-load of ammunition can be caused to be distributed at any point or points, and as rapidly or slowly as needed. For this purpose I provide along the inner side of each of the side chests or casings on the barrow a longitudinally-sliding bar or rod F, supported and guided in its reciprocations by guides F' F', attached to the frame or chest side. As shown, each rod or bar F is flat in cross-section and is provided with the series of pins $f f$, extending beyond its opposite sides.

To allow reciprocation of the bar with its pins the guides are made round instead of flat in cross-section, their internal diameters being equal to the greatest width of the bar. Said bar can then be rotated, if desired, and will always be so engaged by the inner walls of the guides as to be guided steadily in any longitudinal movement. The bars are situated opposite and slide close to the upper ends of the series of swinging hooks or catches $a^4$ $a^4$ on the respective inner sides of the frame A, and each of such hooks or catches has a lug $a^9$ on its upper end above its pivot in position to be engaged by one of the pins $f f$ on the bar as the latter is reciprocated.

In one edge of each bar F are a series of notches $f'$ $f'$ $f'$, so situated that when the bar is in its normal inward position they can be brought into engagement with the lugs $a^9$ $a^9$ on the respective hooks or catches $a^4$ $a^4$ by a rotation of the bar to turn the notched edge toward the frame or casing side. With the lugs on the latches so engaged by the notches in the bar the hinged bottoms of the casing-compartments will obviously be locked shut until the bar is moved.

I have provided means for preventing the longitudinal movement of the bar when it is thus turned to fix the latches $a^4$ $a^4$ in their locking positions, which means I will describe hereinafter. Each bar is at one end, and on the side or edge opposite to that in which are notches $f'$ $f'$, provided with a series of ratchet-teeth $f^2$ $f^2$, extending along the bar for some distance. These teeth, of which there are twenty, just double the number of latches $a^4$ $a^4$, and the corresponding latch-tripping pins on the bar have their inclined sides turned toward the bar end.

Journaled in the frame end are the two rotary blocks or hubs G G, each provided with a slot or passage receiving the end of one of bars F F. On the outer end of each hub is a head or flange G', engaging the outer end of the bearing $g$ in the casing end, while screwed on the inner hub end is the collar or washer $G^2$, engaging the inner end of the bearing $g$. Each hub or block G is slotted at right angles to the slot through which the bar end passes, so as to provide for the passage of the pins $f f$ on the bar as the latter is slid through the hub in one direction or the other.

Attached to each block or hub G is a crank-arm $G^3$, provided with a suitable handle $G^4$, by which the arm can be swung to turn the hub. On the crank-arm is a spring-pressed pawl $G^5$, adapted to engage the ratchet-teeth $f^2$ $f^2$ on the bar. As shown, this pawl is situated within the crank-arm in a longitudinal recess therein, and the pawl-actuating spring $g'$, a spiral one surrounding the stem $g^2$ of the pawl, engages with its inner end a shoulder $g^3$ on the pawl-stem, and at its other end engages a shoulder or abutment $g^4$ within the recess in the crank-arm. The pawl-stem, which is preferably, at its outer end at least, made flat or rectangular in cross-section to prevent rotation of the pawl in the recess, has in its outer portion near its end a longitudinal slot $g^5$.

The crank pin or handle $G^4$ is made hollow, as shown, to receive the pin H, which extends in through the slot $g^5$ in the crank-arm. A spring H' engaging a shoulder $g^6$ within the tubular crank-pin $G^4$, and a shoulder $h$ on the pin H forces the latter normally inward, so that its inner rounded end projects beyond the inner side of the crank-arm toward the end of casing A.

On the outer end of pin H is screwed the hollow knob $h'$, fitting as a movable cap over the end of crank-pin $G^4$. By this knob the pin can be pulled outward against the stress of the spring, which throws it inward again as soon as the knob is released.

The spring-pressed pin forms with its attached knob a spring-latch for locking the crank-arm in different positions of its swing. The end of the frame A can be provided with suitable holes or recesses to be engaged by such latch at any points where it is desirable to lock the crank-arm. In the drawings I show locking studs or bosses I I I, three for each crank, each having a central recess or socket to receive the end of pin H. The sides of these bosses are rounded or beveled, so that as the crank-arm is swung to bring the rounded end of the pin into contact with a boss the pin will be pushed outward against the stress of spring H', and will then snap into the pin-socket in the boss. The studs or bosses I I for each crank are situated one vertically above and one vertically below the crank-hub or rotary piece G and one midway of the swing of the crank between the other two studs on the side toward the other crank-hub. The upper and lower recessed bosses enable the crank-arm to be locked up or down, while by means of the other boss the crank can be locked at right angles to such other positions. When both of the crank-arms are so locked, their outer ends are opposite and close to each other. At the sides of the upper and lower bosses or studs are stops I' I', adapted to engage the respective crank-arms and prevent them being swung over by accident beyond the bosses. Between the two intermediate bosses are studs $I^2$ $I^2$, which, when the crank-arms are in position with their latch-pins engaging the sockets in such bosses, will prevent any longitudinal outward movement of the pawls $G^5$ $G^5$, which engage the ratchet-teeth $f^2$ $f^2$ on the hook-tripping bars F F. With the crank-arms swung into the described intermediate positions and locked, the bars F F will then be locked both from longitudinal movement to move the hooks $a^4$ $a^4$, and from rotation to free the lugs on the hooks from the holding-notches $f'$ $f'$ in the bars.

When the barrow is not in use for distributing the contents of the compartments of its side boxes or casings, the crank-arms are normally kept in their said intermediate positions, and the bottoms of the casing compartments are kept closed by the positive locking of the latch-hooks $a^4$ $a^4$. (Indicated above.) With a crank-arm turned up or down there is nothing to prevent the yielding of pawl $G^5$, and the respective tripping-bar F can be drawn out through the hub or block G, as described. The pawl engaging and and riding over the ratchet-teeth $f^2$ $f^2$ prevents too easy or accidental movement of the bar. Whether the crank-arm is swung into its upright or downward position, the pins $f^2$ $f^2$, projecting, as they do, from both sides of the bar F, will be in position to engage the lugs $a^9$ $a^9$ on the latch-hooks if the bar be moved longitudinally. With the crank-arm swung up or down to turn one edge or the other of bar F upward, all that is necessary then to unlock the traps or bottoms $a^2$ $a^2$ of the compartments in the barrow box or casing and allow the contents of such compartments to be discharged is to pull the bar F longitudinally, sliding it through the hub or rotary block G.

In order to have the hinged bottoms or traps $a^2$ $a^2$ unlocked one at a time as the bar is moved, and not all at once, I place the pins $f$ $f$ on the bar at different distances from the respective lugs $a^9$ $a^9$ on the latch-hooks which they are to engage. As shown in the drawings, the pins are so situated that the compartment-bottom nearest hub G will be unlocked first, then the bottom of the compartment at the other end of the barrow, then that of the second compartment from hub G, then that of the second compartment from the other end of the barrow, and so on throughout the series of compartments of the box, chest, or casing. The discharging of the compartments alternately on one side and the other of the center or axis of the support of the barrow is preferable, as preserving the balance of the barrow and preventing the bringing of much weight on either pair of the barrow-handles.

If desired, the pins $f f$ on the bar F can be so arranged as to effect the discharge of two or more compartments at a time; but I prefer the arrangement described above, allowing only one to be discharged at a time as the bar is moved, for then the rapidity of discharge is more within the control of the operator. He can drop the contents of one compartment, or by moving the bar quickly a greater distance he can cause the discharge of a number of compartments almost simultaneouly. The arrangement described also allows of the automatic discharge of the compartment at predetermined points of the travel of the barrow.

For operating either bar F to automatically cause the latch-hooks $a^4$ $a^4$ to be tripped as the barrow moves, one edge of each bar is provided with a series of teeth $f^3$ $f^3$, adapted, when that edge of the bar is turned upward by the respective crank-arm $G^3$, to be engaged by a tooth or tappet $b^2$ on a disk or flange $B^3$, carried by the wheel-hub B'. At each revolution of the wheel this tooth $b^2$ will engage one of the teeth $f^3$ $f^3$ in the bar edge, and will move the bar a sufficient distance to cause one of the latch-hooks $a^4$ $a^4$ to be tripped, as described hereinbefore. If desired, the hub B' or the flange thereon can obviously be provided with more teeth than one, so as to move the respective bar F more rapidly during the advance of the barrow and consequent rotation of wheel B.

The securing of the successive tripping of the latch-hooks as a bar F moves longitudinally, as described hereinbefore, is a simple matter, depending merely upon the relative location of the pins $f f$ and the latch-hook lugs which they are to engage. The pin for tripping the latch-hook nearest crank-hub G is set nearest its respective latch-hook, while the pin $f$ at the other end of the bar is set a little farther from the hook to be tripped by it. This arrangement is carried out throughout the series of pins and latch-hooks, the second pin from the hub G being farther from its respective latch-hook than is the pin at the other end of the bar and not so far as the pin next to such end pin is from its latch-hook.

Any desired means whereby the operator can pull out either or both bars F can be employed without departure from my invention. I prefer, however, to use the means shown in the drawings, whereby the one pushing or guiding the barrow can, without releasing or letting go the barrow-handles, move the bar as required to discharge the contents of the desired number of the casing-compartments. With this end in view I provide each of the handles with a sliding hand-piece K, to be grasped by the hand of the operator, and connect such piece with the respective tripping-bar F by means of a short cord or chain K', attached at one end to the bar and at the other to a ring $K^2$, engaged by a pin or hooked lug $k$ on the hand-piece. Each sliding hand-piece is made hollow, inclosing and sliding as a sleeve upon the outer end of the barrow-handle, as shown best in Figs. 8 and 9.

To prevent the hand-piece from being by accident pulled out at once to its full extent, so as to cause the tripping-bar to trip too many of the latch-hooks $a^2\ a^2$, I provide the stop mechanism illustrated in the figures referred to. The outer end of the handle proper is slotted longitudinally in a vertical plane, the lower portion of the slot L being made wider than the upper portion thereof. Along the top of this wider part of the slot on each side of the narrow slot portion is a series of notches $l\ l$, equidistant from each other and arranged with those on one side of slot L opposite those on the other side. The sleeve-like hand-piece K is on its lower and inner side provided with a rib $k'$, projecting up into the wide lower portion of said slot, and in such rib are the two sockets or recesses $k^2\ k^2$, in which play the lower ends of pins M M, whose upper ends project up through the slot L and holes in the upper side of the hand-piece. On these pins, in the wider lower portion of slot L, are the cross-heads $m\ m$, preferably made square or rectangular, so as to be engaged and kept from turning by the sides of the slot. Springs $m'\ m'$, whose lower ends are in recesses $k^2\ k^2$, serve to force the pins M M normally upward, so as to throw the heads $m\ m$ up into engagement with the notches $l\ l$ on the barrow-handle. The upper ends of pins M M, which, with their cross-heads and springs, form spring-stops, project up above the top of the hand-piece in convenient position to be engaged and pushed down and inward by the thumb of the hand grasping the hand-piece. These stops are set at such distance apart that when one is in engagement with one of the notches $l\ l$ the other one must be out of engagement with any notch and in engagement with the upper side of the wide lower portion of slot L. With this construction and arrangement, if the spring-stop engaging one of the notches $l$ be pressed down to disengage it from such notch, the hand-piece can be moved until the other pawl comes into engagement with a notch. The hand-piece can then, if first one and then the other stop be pressed in be moved, step by step, each time a distance to cause the tripping-bar to trip one of the latch-hooks to discharge a casing-compartment. If both stops be pressed down together, the hand-piece can be slid out any desired extent at one movement.

To suit each of my barrows for use to carry off the wounded from the field when the barrow is empty or not desired for use to distribute ammunition, I provide it with side hammocks or nettings N N, as shown best in Figs. 4 and 10. For such nettings I hinge a light but strong metal frame N' to the barrow-casing by pivot-pins $n$, engaging suitable lugs $n'\ n'$ on the casing ends. The frames, when swung down for use, are supported in horizontal positions by chains $N^2\ N^2$, attached at one end to the barrow-casing at or near its top and at the other end fastened to the outer ends of the end bars of the frames.

For locking the netting-frames up when not in use, I provide on the casing the spring-catches O O to engage the frame-end bars, as shown in Fig. 10. Brace-chains P P, attached to the barrow-handles and the outer ends of the frame-end bars can also be used.

In Figs. 11, 12, and 13 I show a modified form of my barrow, in which the flat guard or shield extending over the wheel is not shown, but a light frame-work R. The ammunition chests or boxes are shown as detachable, each one being provided on its inner side with a downturned lip or flange S, adapted to engage a corresponding flange S' on the barrow-frame. Each box is preferably made of sheet metal and divided up into several compartments, as indicated in Figs. 12 and 15. The outer sides of these boxes are shown as hinged at their lower edges and fastened at their upper edges by means of hasps $s\ s$.

My modified form of barrow is also shown as adapted to carry along with the ammunition a machine-gun T and its tripod or support T', both being of any desired form and construction. For this purpose one side of the barrow-frame is provided with the bracket or standard U, having at its upper end bearings $u\ u$ for receiving the trunnions $t\ t$ of the gun and hinged caps $u'\ u'$ for holding the trunnions down in such bearings. These caps can be pinned or otherwise fastened so as to be capable of being quickly unlocked and raised when the gun is to be taken from the barrow. A swinging piece U', curved outward and downward, serves to hold the gun from tilting upon its trunnion-rests. On the other side of the barrow is a second standard or bracket V, adapted to receive and support the head of the gun-tripod T', and provided with a hinged strap $v$, adapted to clasp and hold the tripod-head closely down in place on the bracket V. Such strap can be fastened by a pin or hasp, as shown, or by any other desired means. A second support V' on the barrow-frame forward of bracket V serves to receive and hold the tripod-legs, while a pivoted piece $V^2$, like piece U', already described, serves to retain the tripod-legs in place on the support.

For holding the ammunition-boxes down in place with its flange or lip S engaging the flange or socket S' on the frame, I provide one or more swinging pieces $u^2$ on the frame, adapted to be swung over and in engagement with the box tops or the tops of the box-flanges.

In combination with my barrow of either of the described forms I use a frame for coupling or connecting the barrows together, so as to form a vehicle of two or more wheels, which can be drawn by horse or mule power, if desired. The guns, ammunition, or other material or supplies carried by the barrows, can then be transported by horse or mule power to the place where needed, and then can be rapidly transported and distributed where needed on a battle-field or over a very rough country by means of the single-wheeled barrows separated from the coupling-frame.

The barrow-coupling frame which I prefer is rectangular in shape, as shown in the drawings, and is of steel, so that it can be made at the same time strong and light. The front and rear ends of the frame are steel plates or flat bars W and W, turned up on edge and having their upper portions curved over inward toward the frame center. This curving of the plate or bar is to secure stiffness thereof without making the bar thick. If desired, a flanged or angle bar could be used instead.

In the frame illustrated in the drawings, which is adapted to receive two of my barrows, there are the two outer side bars W' W', connecting the ends of the front and rear end bars W W together, and also the two inner bars $W^2 W^2$, parallel with each other and connecting the middle portions of the end bars. Between each outer side bar W' and the nearest inner bar $W^2$ there is space enough to receive one of my barrows.

In the bars W' and $W^2$, at the front and rear of the frame, are the slots $w\ w$ to receive and hold the ends of the handle-shafts C' C', which, as described hereinbefore, project beyond the sides of the barrow. When the shaft ends are in these slots, the heads on such ends engage the sides of the frame-bars W' $W^2$ so as to hold the barrow firmly against side movement or play in the frame. The slots $w\ w$ are preferably of the shape shown, each having the upright entrance portion for admitting the shaft end, and the horizontal portion for receiving and holding such end down in place.

A pawl or catch $w'$ for each slot $w$ serves to retain the respective shaft end in place in the horizontal portion of slot $w$ until it is desired to detach the barrow from the coupling-frame.

The projecting ends of handle-shafts C' C' I term the "draft-studs." Instead of being on the shafts, such studs can be placed, as desired, on any part of the frame or casing of a barrow, the positions of the slots $w\ w$ in the coupling-frame bars being correspondingly changed. The arrangement of studs and slots shown in the drawings is preferred; but I contemplate having the slots in the bars W' $W^2$ open in opposite directions, the slots in one bar opening upward and those in the other downward. I also contemplate providing draft-studs midway of the length of each barrow by extending the shaft or axle upon which the supporting-wheel B is journaled through and beyond the casing or frame side of the barrow. The projecting ends of this axle can then be used as draft-studs to engage suitable slots in or be otherwise connected with the frame for receiving and coupling the barrows.

For strengthening and stiffening the barrow-coupling frame without unduly increasing its weight, I contemplate providing said frame with a longitudinal bar $W^3$ between bars $W^2 W^2$, connected at its ends with the frame end bars W W, and at or about its middle portion with the two bars $W^2 W^2$ by distance pieces or braces $w^2 w^2$, as shown best in Fig. 11. The forward end of the frame is to be provided with any desired means for attachment of the draft-power. As shown, such means can consist of the ordinary form of thills or shafts $W^4 W^4$, fixed to the frame end by bolting, or in any other suitable way.

Where the conditions of the ground to be traveled over render it applicable and capable of use, I propose to use an animal draft-frame in connection with a single barrow. With thills or shafts rigidly attached to the frame and the harness properly constructed, the barrow with one wheel can be kept upright while being drawn. The single barrows can thus be taken by animal-power to the field of action, and then, being detached from the frame, can be propelled and guided by one or two men to point or points on such field where needed.

The barrow-coupling frame can be constructed to couple two, three, or more of the barrows together to form one cart with two, three, or more wheels.

The barrows can be so constructed as to bring the center of gravity of the load as low down as desired; but I prefer to have it as high as is consistent with proper steadying of the barrow by its handles, in order that the barrow can be most easily and freely propelled over rough ground, among stones, stumps, or other obstructions.

The barrow-handles can obviously, instead of being made in one piece with or fastened permanently to the handle-shaft, be made detachable and to fit in suitable sockets on such shafts. The handles can then, when a barrow is not being used singly, be unshipped, to be shipped again at will.

Several of the frames coupling barrows together can be connected by a pintle-hook or other means, so as to be drawn by power applied to one of the frames.

The operation of my vehicle, as described and shown hereinbefore, is briefly as follows: The barrows, coupled together or in single-draft frames, as described, are drawn by draftanimals on the march and outside the line of armed fire. They can then be detached from the draft-frames and propelled by one or two men, as desired, to any point on a field of action to transport and distribute ammunition along a fighting line. With two men to a barrow failure in supply of ammunition cannot be caused by the killing or disabling of one of the men, as is the case with the hand and shoulder barrows heretofore used, for the remaining man can propel my barrow and operate its distributing mechanism. With the shield or guard E and the tops of the boxes or casings thrown up, as described hereinbefore, the one pushing the barrow can obtain good protection from fire in front. When he reaches the point where the ammunition is to be distributed, with the crank-handles $G^3$ $G^3$ turned down, he can, by sliding the hand-pieces on the barrow-handles, cause the contents of the compartments in the barrow-casing to be distributed at any desired intervals. If the intervals of discharge are to be regular with reference to the travel of the barrow, the crank-handles can be turned up to bring the teeth $f^3$ $f^3$ on bars F into position to be engaged by the teeth or tappets $b^2$ $b^2$ on the wheel-hub. The distribution of ammunition will then go on automatically as the barrow advances.

I intend not only to place the latch-tripping pins on each bar F, so that as such bar is moved longitudinally the bottoms of cells alternately to the front and rear of the point of support of casing will be unlocked, but to have the tripping-pins so situated relatively on the two bars F F that as the bars are moved out together the tripping of the latch hooks or locks for the cell-bottoms will take place first on one side of the vehicle and then on the other—that is, as the bars are moved with equal speed a pin on one of them will trip and cause one of the cell-bottoms at one side of the vehicle to be unlocked, and then a pin on the other bar will come into position to trip the latch or lock of one of the other series of cell-bottoms.

When the barrow is empty, it can be thrown on its side so as to present a very small surface to the fire of the enemy, and the man or men running it can join the fighting line. After being emptied or when not in use for distributing ammunition, the barrow can be used to carry off the wounded from the field in the side nets or hammocks.

Where the barrow is used to carry a machine-gun and ammunition it can be rushed by one or two men over a fire-swept space to any desired point and the gun unshipped and mounted on its tripod ready for firing, or under stress of circumstances the gun, especially if an automatic one, can be fired from the barrow itself.

Where used to carry ammunition my barrow affords an efficient means for transporting the ammunition to and distributing it along a fighting line within the line of armed fire in a minimum of time with the least possible amount of man-power, and consequently the least possible weakening of the fighting line.

Having thus described my invention, what I claim is—

1. In a vehicle for transportation purposes, a frame provided with suitable means for attaching draft-power, in combination with two or more separate vehicles connected together by the frame, so as to be capable of separation therefrom and use as separate units of transportation, substantially as and for the purpose specified.

2. In combination with a vehicle for operation by man-power, a detachable frame to receive such vehicle having suitable means for attaching animal draft-power, substantially as and for the purpose shown.

3. In combination with two or more single-wheeled vehicles, a frame for coupling such vehicles together, having means for detachably holding them, substantially as and for the purpose specified.

4. In combination with two or more wheeled hand-barrows provided with propelling and guiding handles adapted to be used as separate units of transportation, a coupling draft-frame and detachable connections between the barrow and frame, substantially as and for the purpose shown.

5. In combination with a wheeled barrow provided with draft-studs, a frame having means to receive and detachably hold the draft-studs on the barrow, and provided with draft-power attachments, substantially as and for the purpose described.

6. In combination with two or more barrows forming units of transportation adapted to be used separately, as desired, each provided with suitable draft-studs, a frame having devices to receive and detachably hold the draft-studs on the barrows, so as to couple the barrows together, and suitable attachments for draft-power, substantially as and for the purpose specified.

7. In combination with a wheeled barrow having suitable draft-studs, a frame for attachment of draft-power having notches or slots to receive the studs on the barrow, substantially as and for the purpose shown.

8. In combination with two or more wheeled barrows having suitable draft-studs, a frame for coupling such barrows together, having notches or slots to receive the studs on the barrows, substantially as and for the purpose set forth.

9. In combination with two or more wheeled barrows, each having suitable draft-studs, the coupling-frame having notches or slots to receive such studs on the barrows, and means for keeping the studs in the slots, adapted to be moved to allow release of the studs from the slots, substantially as and for the purpose described.

10. As a means for transporting guns, ammunition, or other military supplies, a barrow consisting of a single wheel, in combination with a casing centrally supported on such wheel and provided with suitable guiding and propelling handles, substantially as and for the purpose specified.

11. As a means for transporting guns, ammunition, or other military supplies, a barrow consisting of a single central wheel, in combination with the frame provided with suitable holders or receptacles for the barrow-load, and with guiding or propelling handles, substantially as and for the purpose shown.

12. A barrow for transporting ammunition, consisting of a central supporting-wheel, in combination with the frame centrally supported on the wheel, having along its sides casings for receiving ammunition, and at one end guiding and propelling handles, substantially as and for the purpose set forth.

13. The barrow having the frame, the supporting-wheel centrally journaled therein, boxes or casings on the frame sides, and guiding and propelling handles at the opposite ends of the frame, substantially as and for the purpose described.

14. In combination with the barrow having the central wheel and the frame supported thereon, the guard or shield attached to the frame ends and extending over the wheel, and movable shields at the sides of the barrow-frame adapted to be swung up to cover spaces on opposite sides of the central guard or shield, substantially as and for the purpose shown.

15. In combination with the barrow-frame having the side boxes or casings, and the central supporting-wheel journaled within such frame, the shield or guard attached to the frame ends, and the hinged lids of the side boxes adapted to be swung up to form shields at the side of the central shield, substantially as and for the purpose set forth.

16. In combination with the frame of the barrow, the guiding and supporting handles adapted to be at will swung down to act as legs or supports for the barrow, substantially as and for the purpose described.

17. In combination with the barrow-frame and the central supporting-wheel, pairs of handles at opposite ends of the barrow adapted to be at will swung down to act as legs or supports for the barrow, substantially as and for the purpose specified.

18. In combination with the barrow-frame, a transverse shaft journaled in a suitable bearing on the frame, the handles rigidly connected with such shaft, and locking means for locking the shaft from rotation, substantially as and for the purpose shown.

19. In combination with the barrow-frame and the transverse shaft journaled in a suitable bearing on the frame, the handles rigidly connected with the shaft, and means for locking the shaft when the handles have been swung up or down, substantially as and for the purpose set forth.

20. In combination with the barrow-frame and the transverse shaft supported in a suitable bearing on the frame and provided with locking-holes, a pin on the shaft-bearing adapted to engage either one of said locking-holes, substantially as and for the purpose described.

21. In combination with the barrow-frame and the barrow-handles, the transverse shaft by which the handles are connected with the frame having its ends projecting beyond the frame sides to form draft-studs for connecting the barrow with a draft-frame, substantially as and for the purpose specified.

22. In combination with the barrow-frame, the barrow-handles and the shaft to which such handles are rigidly connected journaled in a transverse bearing on the frame and having its ends projecting beyond the frame sides and provided with heads, substantially as and for the purpose shown.

23. In combination with the barrow-frame, the transverse shafts at opposite ends of the frame for connecting the barrow-handles with the latter, each shaft having its opposite ends extending beyond the barrow sides to form draft-studs for connecting the barrow with a suitable draft-frame, substantially as and for the purpose described.

24. As a means for transporting and distributing ammunition, a barrow having several compartments for holding the ammunition, and suitable movable doors or bottoms for closing the compartments, in combination with locking devices for such bottoms, and means for tripping such locking devices, substantially as and for the purpose described.

25. In a vehicle for transporting and distributing ammunition, in combination with a series of compartments for receiving and holding the ammunition, and a series of movable bottoms for such compartments, latches for normally holding the bottoms closed, and means for tripping such latches separately, substantially as and for the purpose specified.

26. In a vehicle for transporting and distributing ammunition, in combination with the series of compartments, and movable doors or bottoms therefor, a series of latches for normally locking such doors, and a movable latch-tripping piece adapted to trip such latches separately at different points of its travel, substantially as and for the purpose shown.

27. In combination with the series of compartments having movable doors to close their outlets, a series of latches for holding such doors normally in position to close the respective compartment-outlets, and a sliding bar having pins for tripping the latches so situated as to trip the latches separately at different points of its travel, substantially as and for the purpose set forth.

28. In combination with the series of compartments and the series of doors for closing their outlets, the series of swinging hooks forming latches for locking the respective compartment-doors, and a sliding bar provided with a series of pins so situated as to engage and trip the latch-hooks separately at different points of its travel in one direction, substantially as and for the purpose described.

29. In combination with a casing having a series of separate compartments, and the series of movable doors or bottoms for closing the outlets of such compartments, the series of pivoted latch-hooks for locking the respective doors or bottoms, and the sliding and rotary bar provided with the series of pins for tripping the latch-hooks, and with the notches for engaging and locking such hooks when the bar is turned into a certain predetermined position, substantially as and for the purpose specified.

30. In combination with the casing having the series of compartments, the movable doors or bottoms for the latter, the series of movable locking devices for the doors, and the reciprocating tripping-bar having the pins for tripping the locking devices projecting from its side, and in its edge a series of notches for locking such devices when the bar is turned, substantially as and for the purpose shown.

31. In a barrow for carrying and distributing ammunition, in combination with the casing provided with a series of compartments, the swinging doors for closing the compartment-bottoms provided with suitable lugs or pins, the series of hooks pivoted on the casing, each adapted to engage a lug on one of the compartment-bottoms, the sliding bar provided with hook-tripping pins along its side, and with the hook-locking notches along its edge, means for turning the bar to bring its side or edge toward the hooks, as desired, substantially as and for the purpose set forth.

32. In a barrow for transporting and distributing ammunition, in combination with a series of compartments along the side of the barrow, and the series of movable bottoms for such compartments, a series of locks or latches for these bottoms, and the sliding bar provided with the latch-tripping pins, so situated as to trip separate latches alternately on opposite sides of the central point of the series, substantially as and for the purpose described.

33. In a barrow for transporting and distributing ammunition, in combination with the central supporting-wheel, and the frame supported thereon having a casing provided with a series of compartments extending equally on opposite sides of the point of support of the frame, suitable doors or bottoms for such compartments, latches for holding them shut, and a sliding bar having the latch-tripping pins so situated as to trip one latch one side and then one on the other side of the point of support of the frame as the bar is moved longitudinally, substantially as and for the purpose specified.

34. In a barrow for transporting and distributing ammunition, in combination with the frame centrally supported upon a suitable wheel, a series of ammunition-receiving compartments along the side of the frame, extending equally to the front and rear of the point of support of the frame, the series of movable bottoms for such compartments, the series of bottom-locking devices, and the sliding bar having the pins for tripping such locking devices so situated as to cause unlocking of the compartment-doors separately alternately to the front and rear of the point of support of the frame, substantially as and for the purpose shown.

35. In a barrow for transporting and distributing ammunition, a series of compartments along the side of the barrow-frame, a series of latch-hooks pivoted on the frame, a series of doors or movable bottoms for the compartments, adapted to be normally held closed by the latch-hooks, and the sliding bar supported in suitable guides on the barrow-frame and provided with tripping-pins to trip the latch, substantially as and for the purpose set forth.

36. In a barrow for transporting and distributing ammunition, in combination with the barrow-frame and a series of compartments therein, a series of movable bottoms for such compartments, a series of pivoted hooks for locking such bottoms, the bar provided with pins along its side to engage and trip the hooks as the bar is moved longitudinally, and with notches in its edge to lock such hooks, the guides on the barrow-frame supporting and holding the bar, so that it can be reciprocated as desired, and rotated to bring the pins or notches in position to engage the hooks, substantially as and for the purpose described.

37. In a barrow for transporting and distributing ammunition, in combination with a series of compartments carried by the barrow-frame and the series of movable bottoms therefor, the series of locking-hooks for the bottoms, the sliding and rotary bar provided with the hook-tripping pins and the hook-locking notches, means for locking the bar against reciprocation when it has been turned to bring its locking-notches into engagement with the hooks, substantially as and for the purpose specified.

38. In a barrow for transporting and distributing ammunition, in combination with a series of compartments on the frame and the supporting-wheel, a series of doors for closing the outlets of the compartments, and a series of locking devices for locking such doors, the sliding bar provided with means for tripping the locking devices, and suitable connections between the bar and wheel whereby the bar can be caused to be moved by the rotation of the wheel, substantially as and for the purpose shown.

39. In a barrow for transporting and distributing ammunition, in combination with a series of compartments on the frame, each provided with a movable bottom normally held shut by a locking device, the bar provided with means for tripping the bottom-locking devices and with teeth, the barrow-supporting wheel, and a tooth or tappet carried thereby adapted to engage the teeth on the bar as the wheel revolves, substantially as and for the purpose set forth.

40. In a barrow for transporting and distributing ammunition, in combination with a series of compartments having movable bottoms and devices for locking the same, the tripping-bar for tripping such locking devices as it is moved, provided with a series of teeth, the barrow-supporting wheel carrying a tooth or tappet for engaging the teeth on the tripping-bar, and means for rotating the bar to bring its teeth into or out of position to be engaged by the tappet on the wheel as the latter revolves, substantially as and for the purpose described.

41. In a barrow for transporting and distributing ammunition, in combination with the frame and the supporting-wheel carrying a tappet, a series of compartments for the ammunition, each provided with a movable bottom and a locking device therefor, the bar provided with the locking device tripping-pins projecting from its opposite sides and with a series of teeth along one edge, and means for turning the bar to bring its toothed edge up to or away from the path of the tappet carried by the wheel, substantially as and for the purpose specified.

42. In combination with the series of latch-hooks, the trip-bar provided with the latch-hook tripping-pins and with the ratchet-teeth, and the spring-pawl engaging such teeth, substantially as and for the purpose shown.

43. In combination with the series of latch-hooks and the trip-bar provided with a series of pins to trip the hooks as the bar is moved longitudinally, and with a series of ratchet-teeth, the rotary hub or piece through which the bar slides, provided with a spring-pawl engaging the ratchet-teeth on the bar, substantially as and for the purpose set forth.

44. In combination with the series of latch-hooks and the trip-bar having a series of pins to trip the hooks, a series of notches to engage and lock the hooks, and a series of ratchet-teeth, the rotary hub or piece slotted to allow the bar to slide through it, means for rotating such hub, and a spring-pawl on the hub engaging the ratchet-teeth on the bar, substantially as and for the purpose described.

45. In combination with the series of latch-hooks, the reciprocating and rotary bar having the notches to lock the latch-hooks, and the ratchet-teeth, the rotary hub or piece through which the bar can slide, but with which it rotates, the spring-pawl carried by such piece engaging the ratchet-teeth on the bar, and means for locking the pawl from movement when the hub and bar are turned to bring the notches on the latter into engagement with the latch-hooks, substantially as and for the purpose specified.

46. In combination with a suitable frame and the series of latch-hooks, the bar having the pins for tripping the hooks, the notches for locking the same and the ratchet-teeth, the rotary hub slotted to allow the bar to slide through it, and provided with suitable means for rotating it, the spring-pawl on the hub engaging the ratchet-teeth on the bar, and a stop on the frame to lock the pawl from movement when the hub and bar have been turned to bring the notches in engagement with the hooks, substantially as and for the purpose shown.

47. In combination with a suitable frame and the series of latch-hooks, the trip-bar provided with the series of pins on its side to trip the hooks, the notches in one edge to lock the hooks and the ratchet-teeth, the rotary hub slotted to permit the bar to slide in it, a handle to turn the hub, the spring-pawl engaging the ratchet-teeth on the bar, means for locking the hub when it has been turned to bring the stop-pins or the notches on the side toward the hooks, and a stop to lock the spring-pawl when the handle has been swung into position to bring the notches in the bar edge in engagement with the latch-hooks, substantially as and for the purpose set forth.

48. In combination with the sliding trip-bar provided with ratchet-teeth, the means for rotating it and locking it from reciprocation, consisting in the rotary slotted hub journaled in a suitable frame, the spring-pawl carried by the hub and engaging the teeth on the bar, the handle for rotating the hub, and a stop or lug to engage and hold the pawl when the handle has been moved to a certain position, substantially as and for the purpose described.

49. In combination with the series of latch-hooks, the bar provided with the hook-tripping pins, the hook-locking notches, and the ratchet-teeth, the slotted rotary hub engaging the bar, the spring-pawl on the hub engaging the ratchet-teeth on the bar, a suitable handle for rotating the hub, means for locking the handle at different points of the swing, and a fixed piece adapted to engage and hold the spring-pawl from yielding when the handle, hub, and bar are turned to bring the locking-notches on the bar into engagement with the hooks, substantially as and for the purpose specified.

50. In a barrow having a suitable wheel provided with a tappet, in combination with the series of latch-hooks for locking the doors of the casing-compartments of the barrow, the bar provided with the pins projecting from its opposite sides and with teeth along one edge, a rotary hub connected with the bar, so that the latter can slide through but must rotate with it, an arm for rotating the hub to bring the toothed or the plain edge of the bar toward the wheel-tappet, and means for locking such arm, substantially as and for the purpose shown.

51. In a barrow for transporting and distributing ammunition, in combination with the supporting-wheel carrying a tappet and the series of latch-hooks for locking the bottoms of the compartments of the barrow, the trip-bar having the series of trip-pins projecting from both sides, the teeth along one edge to be engaged by the wheel-tappet, and the hook-locking notches in the other edge, the slotted hub, the handle connected therewith, and means for locking the handle at different points of its swing, substantially as and for the purpose set forth.

52. In combination with the series of latch-hooks, the trip-bar provided with trip-pins projecting from its sides, hook-locking notches in one edge and teeth on the other edge, a rotary wheel carrying a tappet to engage such teeth, the rotary hub slotted to engage the bar, a handle connected with the hub, a spring-stop on the handle, and suitable devices to be engaged by such stop-pin to lock the handle and hub at different points of its swing, substantially as and for the purpose described.

53. In combination with a suitable frame, the trip-bar provided with tripping pins or studs and with the ratchet-teeth, the rotary hub slotted to allow the bar to slide through it, the spring-pawl on the hub engaging the ratchet-teeth on the bar, the handle for turning the hub, the spring stop-pin on the handle, and suitable stop-pin-engaging devices on the frame, substantially as and for the purpose specified.

54. In a barrow for transporting and distributing ammunition having discharging devices for discharging the barrow-load, the barrow-handles, in combination with sliding pieces on the handles connected with the discharging devices so as to operate the same, substantially as and for the purpose shown.

55. In a barrow, in combination with the series of compartments and means for discharging the contents thereof, a sliding piece on a handle of the barrow, and suitable connections between such piece and the discharging devices, substantially as and for the purpose set forth.

56. In a barrow, in combination with the series of compartments having movable bottoms, the series of locking devices for locking such bottoms, the movable trip-bar for tripping the locking devices, and a movable piece on the barrow-handle connected with the trip-bar, substantially as and for the purpose described.

57. In a barrow for transporting and distributing ammunition having the series of compartments along opposite sides, the devices for discharging such compartments, the barrow-handles, and movable pieces thereon connected with the discharging devices, substantially as and for the purpose specified.

58. In a barrow for transporting and distributing ammunition, in combination with a series of compartments provided with movable bottoms, locking devices for such bottoms, a sliding rod provided with means for tripping such locking devices as the bar is moved, and the sliding hand-piece on the barrow-handle connected with the bar, substantially as and for the purpose shown.

59. In combination with the barrow having the two series of compartments along its opposite sides, doors or movable bottoms for the respective compartments, locking devices for such doors, the two movable trip-bars, each provided with means for tripping the locking device along one series of compartments, the two barrow-guiding handles, and a sliding hand-piece on each handle connected with one of the trip-bars, substantially as and for the purpose set forth.

60. In a barrow for transporting and distributing ammunition, in combination with the discharging devices therefor and a guiding-handle of the barrow, the sliding hand-piece on the handle, the two spring-stops on the hand-piece, and the longitudinal series of notches on the handle to be engaged thereby, substantially as and for the purpose described.

61. As a means for actuating the discharging devices of a barrow, the sliding hand-piece on the barrow-handle connected with the discharging devices, and stop mechanism for allowing a step-by-step sliding motion of the hand-piece, substantially as and for the purpose specified.

62. As a means for actuating the discharging mechanism of a barrow, the barrow-handle provided with a longitudinal series of notches, the sliding piece, and the two spring-stops carried thereby, so situated as to alternately come into engagement with the notches on the barrow-handle as the sliding piece is moved, substantially as and for the purpose shown.

63. A centrally-supported wheeled barrow having on its opposite sides suitable nettings or hammocks for transportation of the wounded, substantially as and for the purpose set forth.

64. A barrow having the central wheel, and a suitable frame supported on such wheel and having at its sides supports for transporting the wounded, adapted to be folded up against the frame sides when not in use, substantially as and for the purpose described.

65. A barrow having the central supporting-wheel, the guiding and propelling handles and hinged frames at its sides adapted, when swung down, to be used for carrying purposes, substantially as and for the purpose specified.

66. A barrow for use for military and transportation purposes, having the central supporting-wheel, the side casings, the guiding and propelling handles, and the hinged supports at the side of the casings adapted to swing up out of the way when not desired for use, substantially as and for the purpose shown.

67. In combination with the barrow-casing, the frames hinged to the sides of such casing, each supporting a hammock or netting, suitable supports for holding such frames when swung down into horizontal position, and locking devices on the barrow-casing for holding the netting-frames when swung up and out of use, substantially as and for the purpose set forth.

In testimony that I claim the foregoing I have hereunto set my hand this 14th day of March, 1888.

WILLIAM W. KIMBALL.

Witnesses:
FRANCIS H. RICHARDS,
GEO. W. DRAKE.